US008105683B2

(12) United States Patent
Thompson et al.

(10) Patent No.: US 8,105,683 B2
(45) Date of Patent: Jan. 31, 2012

(54) TREATED REFRACTORY MATERIAL AND METHODS OF MAKING

(75) Inventors: Anthony Mark Thompson, Niskayuna, NY (US); Roman Shuba, Niskayuna, NY (US); Peter Joel Meschter, Niskayuna, NY (US); Krishan Lal Luthra, Niskayuna, NY (US); Vikas Behrani, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 11/683,260

(22) Filed: Mar. 7, 2007

(65) Prior Publication Data

US 2008/0216603 A1   Sep. 11, 2008

(51) Int. Cl.
*C21B 7/06* (2006.01)

(52) U.S. Cl. ............ 428/307.7; 427/140; 427/226; 427/314; 427/229; 75/330; 75/301; 428/701; 428/304.4

(58) Field of Classification Search .......... None
See application file for complete search history.

(56) References Cited

U.S. PATENT DOCUMENTS

| 3,031,340 | A | * | 4/1962 | Girardot | 428/420 |
| 3,734,767 | A | * | 5/1973 | Church et al. | 501/127 |
| 3,789,096 | A |   | 1/1974 | Church et al. | |
| 3,888,790 | A | * | 6/1975 | Chay | 502/204 |
| 3,992,161 | A | * | 11/1976 | Cairns et al. | 75/234 |
| 4,374,897 | A | * | 2/1983 | Yamaguchi | 428/446 |
| 4,568,652 | A |   | 2/1986 | Petty, Jr. | |
| 5,053,366 | A |   | 10/1991 | Schoennahl | |
| 5,252,357 | A |   | 10/1993 | De LePrevier | |
| 5,306,451 | A | * | 4/1994 | Wachter | 264/628 |
| 6,455,102 | B1 | * | 9/2002 | Kobayashi et al. | 427/140 |
| 6,815,386 | B1 |   | 11/2004 | Kwong et al. | |
| 2002/0028344 | A1 | * | 3/2002 | Beele | 428/632 |
| 2005/0245387 | A1 |   | 11/2005 | Zhu et al. | |

FOREIGN PATENT DOCUMENTS

| EP | 0911298 | A |   | 4/1999 |
| FR | 2345408 | A |   | 10/1977 |
| GB | 1087035 | A |   | 10/1967 |
| GB | 1569474 |   | * | 6/1980 |
| JP | 54055012 | A |   | 5/1979 |
| JP | 55080782 | A |   | 6/1980 |

(Continued)

OTHER PUBLICATIONS

J. Rawers, et al., "Initial stages of coal slag interaction with high chromia sesquioxide refractories", Journal of Material Science, 37 (2002) 531-538.

(Continued)

*Primary Examiner* — Jennifer McNeil
*Assistant Examiner* — Vera Katz
(74) *Attorney, Agent, or Firm* — GE Global Patent Operation; Catherine J. Winter

(57) ABSTRACT

A treated refractory material includes a sintered porous refractory material having one or more protective materials disposed within pores of the refractory material, wherein the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof. Methods of preparing the treated refractory material are also provided. The treated refractory material provides protection from the penetration of slag and extends the service life of the refractory.

33 Claims, 4 Drawing Sheets

FOREIGN PATENT DOCUMENTS

| | | |
|---|---|---|
| JP | 62070258 A | 3/1987 |
| JP | 03228860 A | 10/1991 |
| JP | 04342454 A | 11/1992 |
| JP | 07165461 A | 6/1995 |
| JP | 07291716 A | 11/1995 |
| JP | 08245261 A | 9/1996 |
| JP | 2000327406 A | 11/2000 |
| JP | 2002020161 | 1/2002 |
| JP | 2002316868 | 10/2002 |
| JP | 2002316868 A | 10/2002 |
| JP | 05043306 A | 9/2006 |
| KR | 2006073705 A | 6/2006 |
| WO | 2006097609 A | 9/2006 |

OTHER PUBLICATIONS

C. Dogan, et al., "Improved Refractories for Slagging Gasifiers in IGCC Power Systems", National Energy Technology Laboratory, Jan. 1, 2002.

* cited by examiner

TREATED REFRACTORY MATERIAL AND METHODS OF MAKING

FIELD OF THE INVENTION

This invention relates to refractory materials and more particularly, to treated refractory material for minimizing slag penetration.

BACKGROUND OF THE INVENTION

In a slagging coal gasifier, coal or coke is partially oxidized at 1300-1600° C. to produce a mixture of CO, $CO_2$, $H_2$ and $H_2O$ (syngas). The coal typically contains up to 25 percent by weight of inorganic minerals that combine to form a low viscosity molten slag, which contains $SiO_2$, $Al_2O_3$, CaO and iron oxide.

The walls of the gasifier are lined with refractory material, which is typically prepared from $Cr_2O_3$ grains or a blend of $Cr_2O_3$ and $Al_2O_3$ grains, formed into bricks and sintered. The refractory material has a connected pore structure and is quite porous. As the slag flows along the walls of the gasifier, it infiltrates into the pores in the refractory material. This infiltration causes refractory degradation through a combination of grain dissolution, grain undercutting and macrocracking.

U.S. Pat. No. 6,815,386 to Kwong et al., discloses the use of phosphates to reduce slag penetration in $Cr_2O_3$-based refractory material. Phosphorous compounds are applied to the refractory material or are added to the matrix binder of the refractory material and heat treated to form phosphates.

What is needed is an improved treated refractory material for minimizing the penetration of liquid slag and an improved method for treating the refractory material.

SUMMARY OF THE INVENTION

In one embodiment, a treated refractory material comprises a sintered porous refractory material having one or more protective materials disposed within pores of the refractory material, wherein the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof.

In another embodiment, a process for making treated refractory material comprises adding one or more protective materials to pores of porous sintered refractory material, wherein the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof.

In another embodiment, a process for making treated refractory material comprises blending refractory material and one or more protective materials and sintering the blend, wherein the protective material is selected from the group consisting of silica, rare earth oxides, rare earth zirconates, titanium oxide, mullite, zirconium silicate, yttrium oxide, magnesium oxide, iron oxide, and blends thereof.

In another embodiment, a process for making treated refractory material comprises blending refractory material and one or more precursors of protective materials and sintering the blend, wherein the precursor material is in elemental or compound form and comprises an element selected from the group consisting of silicon, rare earth elements, zirconium, titanium, yttrium, magnesium, iron, and blends thereof.

The various embodiments are relatively inexpensive and provide protection to refractory materials from the penetration of slag and extend the service life of refractory material.

DETAILED DESCRIPTION OF THE INVENTION

Figure 1:
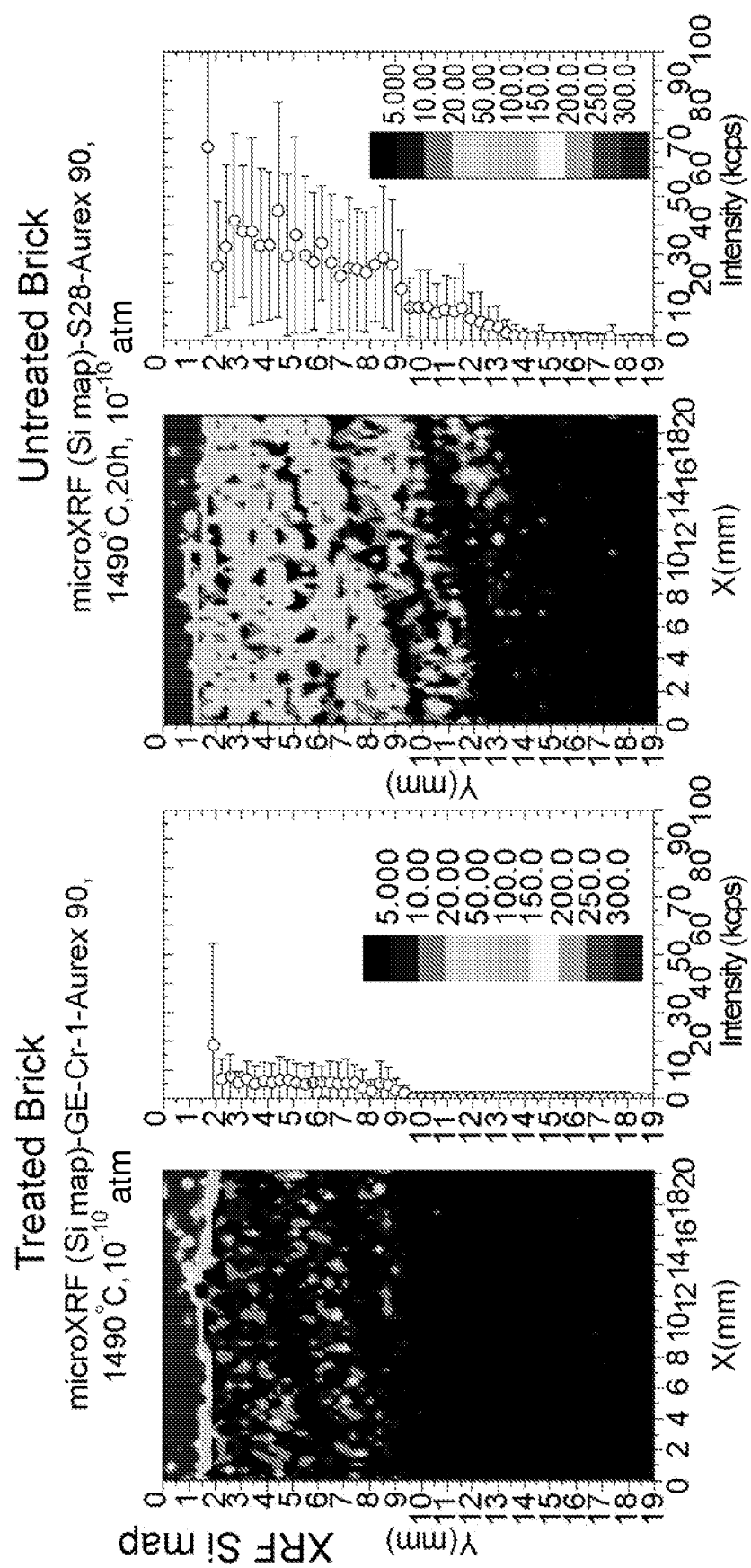
FIG. 1 shows an XRF Si map of the slag penetration of an untreated brick and treated brick described in Example 1.

The singular forms "a," "an" and "the" include plural references unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

The oxidation state of the elements used may vary. The mention of the oxide of any element in one oxidation state includes oxides of this element in all existing oxidation states. For instance, cerium oxide includes $Ce_2O_3$ and $CeO_2$, iron oxide includes FeO and $Fe_2O_3$ and chromium oxide includes $Cr_2O_3$ and CrO.

In one embodiment, a treated refractory material comprises a sintered porous refractory material having one or more protective materials disposed within pores of the refractory material, wherein the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof.

Refractory materials line the walls of a gasifier and may comprise any type of suitable material for a gasifier. In one embodiment, the refractory material comprises chromium oxide. In another embodiment, the refractory material comprises greater than or equal to 40 percent by weight chromium oxide. In another embodiment, the refractory material comprises at least 60 percent by weight chromium oxide.

In another embodiment, the refractory material comprises chromium oxide and aluminum oxide. The refractory material may comprise from about 40 to about 95 percent by weight chromium oxide and from about 5 to about 60 percent by weight aluminum oxide, based on the weight of the refractory material. In one embodiment, the refractory material comprises from about 60 to about 95 percent by weight chromium oxide and from about 5 to about 40 percent by weight aluminum oxide, based on the weight of the refractory material.

In another embodiment, the refractory material comprises chromium oxide, aluminum oxide and zirconium oxide. The refractory material may comprise from about 40 to about 90 percent by weight chromium oxide, from about 5 to about 10 percent by weight zirconium oxide and from about 5 to about 55 percent by weight aluminum oxide, based on the weight of the refractory material. In one embodiment, the refractory material comprises from about 60 to about 90 percent by weight chromium oxide, from about 5 to about 10 percent by weight zirconium oxide and from about 5 to about 35 percent by weight aluminum oxide, based on the weight of the refractory material.

The refractory material is porous and has a connected pore structure and includes open pores and closed pores. The pores typically range in size from about 1 μm to about 200 μm in diameter.

A preformed refractory material is refractory material that has been formed into a desired shape and sintered. In one embodiment, the refractory material is formed into a brick or block. In another embodiment, the preformed refractory material is a sintered brick or an as-fabricated brick. In another embodiment, the bricks have been assembled into the gasifier.

Refractory material is sintered by firing or heat treating the material to a temperature of at least about 1000° C. In one embodiment, the refractory material is fired at a temperature from about 1000° C. to about 1800° C. In one embodiment, the refractory material is fired for at least about 1 hour. In another embodiment, the refractory material is fired from about 1 hour to about 24 hours. In another embodiment, the refractory material is fired from about 1 hour to about 5 hours. The refractory material may be sintered in air or in a nitrogen or argon environment.

The protective materials are chemically compatible with the refractory materials and will not decompose in typical gasifier operating atmospheres of up to about 30 to about 60 atm and at typical gasifier operating temperatures of up to about 1300 to about 1600° C. The protective materials are any type of material that impedes the infiltration of slag into the refractory material. As explained above, liquid slag is a low viscosity blend of inorganic oxides that is produced as a by-product in a slagging coal gasifier when the coal or coke is partially oxidized. The slag may contain silica, aluminum oxide, calcium oxide and iron oxide. The slag can infiltrate into pores in the refractory material and degrade the refractory material.

In one embodiment, the protective material comprises material that at least partially fills the pores in the refractory material to prevent the slag from infiltrating into the refractory material and/or material that reacts with the infiltrating slag to modify the viscosity or wetting behavior of the slag or to decrease the amount of liquid phase in the slag. In one embodiment, the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof.

Precursor compounds may be added to the refractory material. Precursor compounds react or decompose to form a metal oxide, metal silicate or metal zirconate. In one embodiment, the precursor compound is in elemental or compound form and comprises an element selected from the group consisting of silicon, rare earth metals, zirconium, titanium, yttrium, magnesium, iron, and blends thereof. In another embodiment, the precursor compounds may be salts of metal oxides, metal silicates or metal zirconates. In another embodiment, salts of the metal compounds include nitrates and acetates. For example, the precursor compounds may be aluminum nitrate, chromium nitrate, silicon nitrate, rare earth nitrates, titanium nitrate, zirconium nitrate, yttrium nitrate, magnesium nitrate, iron nitrate, or blends thereof. In another embodiment, the precursor compounds may be chromium acetate, silicon acetate, rare earth acetates, zirconium acetate, yttrium acetate, or blends thereof.

Rare earth metals are elements from the lanthanide series, such as lanthanum, cerium, praseodymium, neodymium, promethium, samarium, europium, gadolinium, terbium, dysprosium, holmium, erbium, thulium, ytterbium, lutetium and mixtures thereof. The rare earth oxides are oxides of elements from the lanthanide series, such as lanthanum, cerium, praseodymium, neodymium, promethium, samarium, europium, gadolinium, terbium, dysprosium, holmium, erbium, thulium, ytterbium and lutetium. In one embodiment, the rare earth oxide is cerium oxide. In another embodiment, the rare earth oxides may be a mixture or alloy of rare earth oxides.

Rare earth zirconates are zirconates that have a formula of $RE_2Zr_2O_7$, where RE is a rare earth element from the lanthanide series, such as lanthanum, cerium, praseodymium, neodymium, promethium, samarium, europium, gadolinium, terbium, dysprosium, holmium, erbium, thulium, ytterbium and lutetium. In one embodiment, the rare earth zirconate is cerium zirconate, gadolinium zirconate, lanthanum zirconate or neodymium zirconate.

The protective materials may comprise blends. In one embodiment, the protective material may comprise a blend of aluminum oxide and silica. In another embodiment, the protective material may comprise a blend of magnesium oxide and iron oxide. In another embodiment, the protective material may comprise a blend of aluminum oxide, chromium oxide, iron oxide and magnesium oxide. When blends of protective materials are employed, the compounds may be added to the refractory material together or separately.

The amounts of each component in the blend may be in any amount from 0 to 100 percent by weight based on the weight of the blend. In one embodiment, the blend of aluminum oxide and silica comprises from about 10 to about 90 percent by weight of aluminum oxide and from about 10 to about 90 percent by weight silica based on the weight of the blend. In another embodiment, the blend of aluminum oxide and silica comprises from about 20 to about 80 percent by weight of aluminum oxide and from about 20 to about 80 percent by weight silica, based on the weight of the blend. In another embodiment, the blend of aluminum oxide and silica comprises from about 40 to about 60 percent by weight of aluminum oxide and from about 40 to about 60 percent by weight silica, based on the weight of the blend.

The magnesium oxide and iron oxide combination comprises from about 10 to about 90 percent by weight magnesium oxide and from about 10 to about 90 percent by weight iron oxide, based on the weight of the combination. In another embodiment, the magnesium oxide and iron oxide combination comprises from about 30 to about 70 percent by weight magnesium oxide and from about 30 to about 70 percent by weight iron oxide, based on the weight of the combination. In another embodiment, the magnesium oxide and iron oxide combination comprises from about 40 to about 60 percent by weight magnesium oxide and from about 40 to about 60 percent by weight iron oxide, based on the weight of the combination.

In one embodiment, the blend of aluminum oxide, chromium oxide, iron oxide and magnesium oxide comprises from about 1 to about 50 percent by weight aluminum oxide, from about 1 to about 50 percent by weight chromium oxide, from about 1 to about 50 percent by weight iron oxide and from about 1 to about 50 percent by weight magnesium oxide, based on the weight of the blend.

The protective material may be added to the pores of the porous refractory material by infiltrating the protective material into the refractory material and dispersing the material into the pores. The protective material infiltrates the refractory material by any method known in the art, such as painting, spraying, dipping, coating or vacuum infiltration. In one embodiment, the protective material infiltrates the refractory material as a suspension, slurry or liquid solution. The protective material may be a precursor compound, such as a salt, and is dispersed in a solvent, such as water, an alcohol or other type of organic solvent. In one embodiment, the precursor material may be a nitrate or acetate salt. The suspension, slurry or liquid solution penetrates into the refractory material depositing the protective material throughout the pores of the porous refractory material. The refractory material is heat treated to evaporate the solvent or decompose the solvent leaving the protective material situated throughout the open pores of the refractory material. For example, chromium nitrate or aluminum nitrate is infiltrated into the refractory material and heat treated to leave chromium oxide or aluminum oxide situated in the pores of the refractory material. The heat treatment to evaporate or decompose the solvent is at a temperature in a range of from about 100° C. to about 1000° C. from about 1 hour to about 10 hours. In another embodiment, the heat treatment is at a temperature in a range of from about 500° C. to about 700° C. from about 1 to about 2 hours.

The protective material may infiltrate the refractory material in the form of a powder. The powder may comprise micron-sized or nano-sized particles. In one embodiment, the particle sizes range from about 5 nm to about 200 µm. In another embodiment, the particle sizes range from about 5 nm to about 100 µm. In another embodiment, the powder comprises particles ranging in size from about 1 µm to about 10 µm. In another embodiment, the particle sizes range from about 1 µm to about 2 µm. In one embodiment, the protective material comprises nano-sized particles. In one embodiment, the protective material comprises particle sizes from about 5 nm to about 100 nm. In another embodiment, the protective material comprises a particle size from about 5 nm to about 10 nm. Nano-sized powders are infiltrated as colloid solutions with typical solid loadings of about 10 to about 50 percent by weight. The colloid solution may be an aqueous suspension and may contain surfactants to aid in dispersing the particles.

In another embodiment, the protective material is dispersed by vacuum infiltration. In one embodiment, a preformed refractory material, such as a sintered brick or an as-fabricated brick, is placed under vacuum. A solution or suspension of the protective material is admitted to penetrate the pores of the refractory material and the vacuum is released. In an alternative embodiment, the refractory material can first be immersed in the suspension or solution and a vacuum applied. The solution or suspension infiltrates into the refractory material as the vacuum is applied. Upon release of the vacuum, no further infiltration is obtained. In a further embodiment, the solution or suspension is admitted into the material by infiltration at atmospheric pressure.

In one embodiment, the amount of protective material comprises from about 2 to about 15 percent by volume based on the total volume of the refractory material. The protective material infiltrates the refractory material to partially fill the pores of the refractory material. In one embodiment, the protective material fills from about 3 percent to about 60 percent of the pore volume. In another embodiment, the protective material infiltrates the refractive material to fill from about 20 percent to about 50 percent of the pore volume. In one embodiment, the protective material at least partially coats the inner surfaces of the pores and forms a sacrificial barrier within the pores to inhibit the penetration of liquid slag into the refractory material.

The refractory material may be treated with the protective material before or after the refractory material has been assembled into a gasifier. In one embodiment, the protective material is applied as a final coating to the refractory material lining the walls of the gasifier. The treated refractory brick retains the mechanical and physical properties of the as-fabricated brick.

The treated refractory material minimizes the penetration of liquid slag into the refractory material. In one embodiment, as the slag begins to penetrate the surface pores of the refractory material, the liquid slag encounters the protective materials disposed within the pores. The liquid slag reacts with the protective materials to create either a high-melting phase or phases or a high-viscosity liquid. In either case, further penetration of the liquid slag is suppressed. Creation of a high-melting phase or phases reduces the volume of liquid phase and minimizes slag penetration into the refractory material. Increasing the viscosity also inhibits penetration of the liquid slag deeper into the refractory material. For example, in one embodiment, aluminum oxide is disposed within pores of the refractory material. When the infiltrating slag contacts the aluminum oxide, the slag/oxide reaction precipitates higher-melting phases, such as anorthite, and reduces the volume of liquid phase available for penetration into the refractory material.

In another embodiment, when fine particles of silica are disposed within pores of the refractory material, the slag will become enriched in silica. The addition of silica increases the viscosity of the liquid slag. Such an increased viscosity inhibits slag penetration into the refractory material.

A combination of approaches can be used to both increase the viscosity and raise the melting temperature of the liquid slag. In one embodiment, the protective infiltrant is a blend of aluminum oxide and silica. The aluminum oxide causes precipitation of higher-melting phases and the silica increases the viscosity of the remaining liquid slag.

In another embodiment, the protective material minimizes the penetration of the slag into the refractory material by filling openings between grains of the refractory material. For example, chromium oxide is resistant to dissolution in slag, but reduces the permeability of the refractory material by filling channels between grains with relatively inert material.

In another embodiment, a process for making treated refractory material comprises adding one or more protective materials to pores of porous sintered refractory material, wherein the protective material is selected from the group consisting of aluminum oxide, chromium oxide, silica, rare earth oxides, rare earth zirconates, titanium oxide, mullite, zirconium oxide, zirconium silicate, yttrium oxide, magnesium oxide, iron oxide, and blends thereof.

As explained above, the protective material is added to the refractory material by infiltrating the protective material into the refractory material and dispersing the material into the pores. The protective material infiltrates the refractory material by any method known in the art, such as painting, spraying, dipping, coating or vacuum infiltration. The protective material may be a precursor compound, such as a salt, and is dispersed in a solvent, such as water, an alcohol or other type of organic solvent. In one embodiment, the precursor material may be a nitrate or acetate salt.

In another embodiment, a process for making treated refractory material comprises blending refractory material and one or more protective materials and sintering the blend, wherein the protective material is selected from the group consisting of silica, rare earth oxides, rare earth zirconates, titanium oxide, mullite, zirconium silicate, yttrium oxide, magnesium oxide, iron oxide, and blends thereof.

In another embodiment, a process for making treated refractory material comprises blending refractory material and one or more precursors of protective materials and sintering the blend, wherein the precursor material is in elemental or compound form and comprises an element selected from the group consisting of silicon, rare earth elements, zirconium, titanium, yttrium, magnesium, iron, and blends thereof.

As explained above, precursor compounds react or decompose to form a metal oxide, metal silicate or metal zirconate. In one embodiment, the precursor compounds may be salts of the metal oxides, metal silicates or metal zirconates. In another embodiment, salts of the metal compounds include nitrates and acetates.

The protective material is blended with the refractory material in any amount that is suitable for treating the refractory material. In one embodiment, the protective material is added in amount of from about 1 to about 10 percent by weight based on the weight of the blend. In another embodiment, the protective material is added in amount of from about 5 to about 10 percent by weight based on the weight of the blend.

The blend of refractory material and protective material may be formed into any desired shape. In one embodiment, the refractory material is formed into a brick or block. The blend of refractory material and protective material is sintered by firing or heat treating the material to a temperature of at least about 1000° C. In one embodiment, the material is fired at a temperature from about 1000° C. to about 1800° C. In one embodiment, the refractory material is fired for at least about 1 hour. In another embodiment, the refractory material is fired from about 1 hour to about 24 hours. The refractory material may be sintered in air or in a nitrogen or argon environment.

The treated refractory materials can impart some measure of self-healing. If the surface layers of the refractory material are removed, the underlying protective material disposed within the refractory material will again react with the slag to reform a renewed protective layer against further infiltration of slag.

In order that those skilled in the art will be better able to practice the present disclosure, the following examples are given by way of illustration and not by way of limitation.

EXAMPLES

Example 1

A sintered high chromia (90 wt %) brick was infiltrated with chromium (III) nitrate solution multiple times followed by subsequent heat treatments in air at 600° C. for 2 hours to decompose the nitrate salt into chromium oxide. The weight of the protective material constituted approximately 10 percent by weight of the refractory brick after all infiltrations. The infiltrated brick was then annealed in a $N_2/5\% H_2$ mixture at 1600° C. for 20 hours to prereact the chromium oxide before the slag infiltration. The porosity of the untreated refractory before the slag infiltration was about 18-20 vol. %. After infiltration and heat treatment, the porosity was about 12-14 vol. %.

A slag infiltration test via isothermal annealing of cups filled with slag was performed on the brick infiltrated with chromium oxide and on an untreated brick. The slag composition contained 59.0% silica, 10.7% aluminum oxide, 8.3% calcium oxide, 21.6% iron oxide and 0.3% potassium oxide. Test parameters were 1500° C. for 20 hours at an oxygen partial pressure of $10^{-10}$ atm provided via a mixture of wet and dry $N_2/5\% H_2$ gas.

Figure 2:
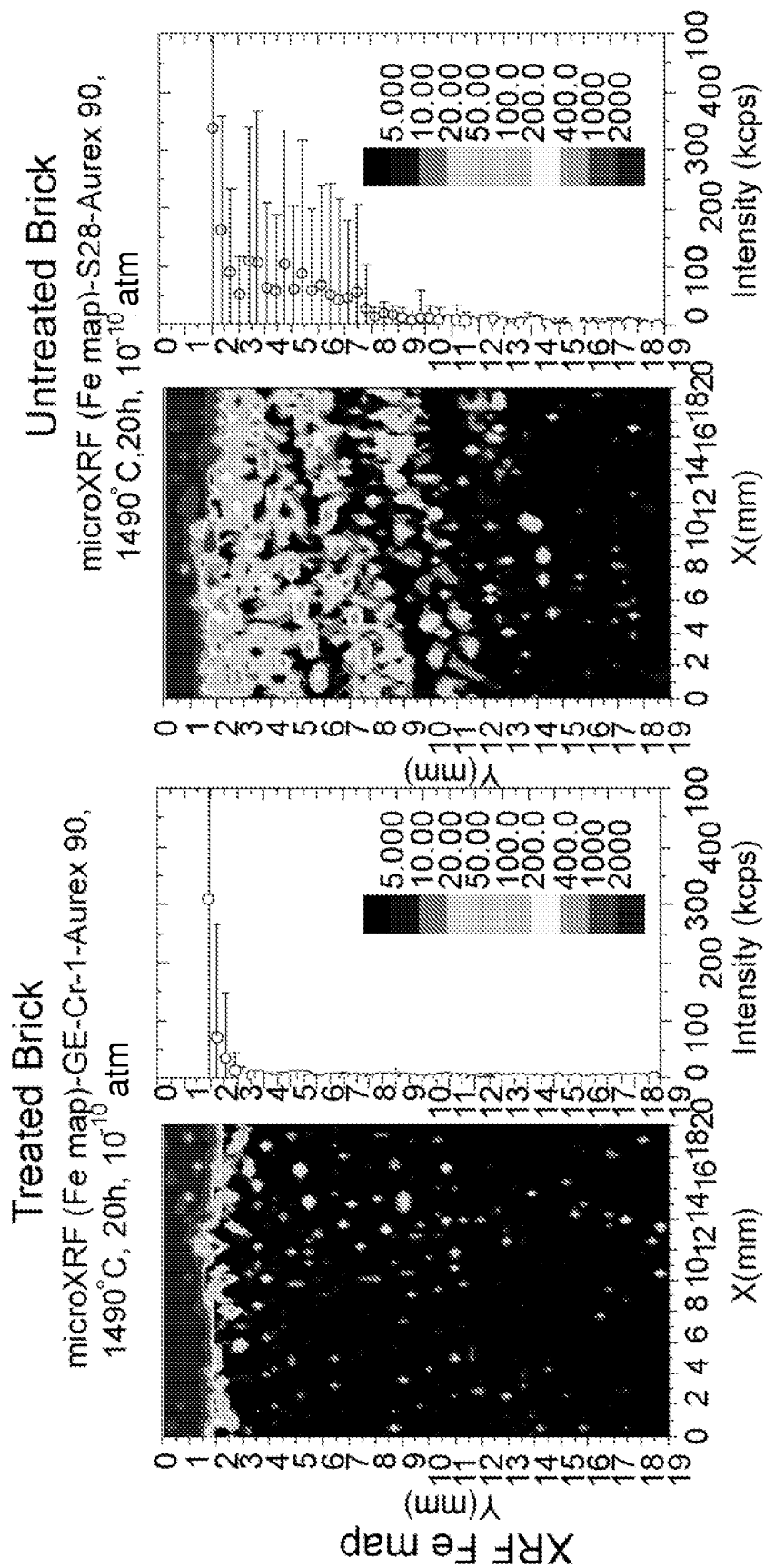
FIG. 2 shows an XRF Fe map of the slag penetration of an untreated brick and treated brick described in Example 1.

Subsequent analysis of slag penetration by XRF mapping of Si and Fe distribution at the brick cross-section revealed that slag penetration in the treated brick is much less than the slag penetration into the untreated brick. FIG. 1 shows an XRF mapping of Si of the slag penetration of the untreated sintered brick and the treated brick. FIG. 2 shows an XRF mapping of Fe of the slag penetration of the untreated brick and the treated brick.

Example 2

Example 1 was reproduced with the exception of using chromium (III) acetate $(Cr_3(OH)_3(CH_3COO)_2$ as the precursor to the chromium oxide protective material. A slag infiltration test via isothermal annealing of cups filled with slag was performed on the brick infiltrated with chromium oxide and on an untreated brick. Test parameters were 1500° C. for 20 hours at an oxygen partial pressure of $10^{-10}$ atm provided via a mixture of wet and dry $N_2/5\% H_2$ gas.

Figure 3:
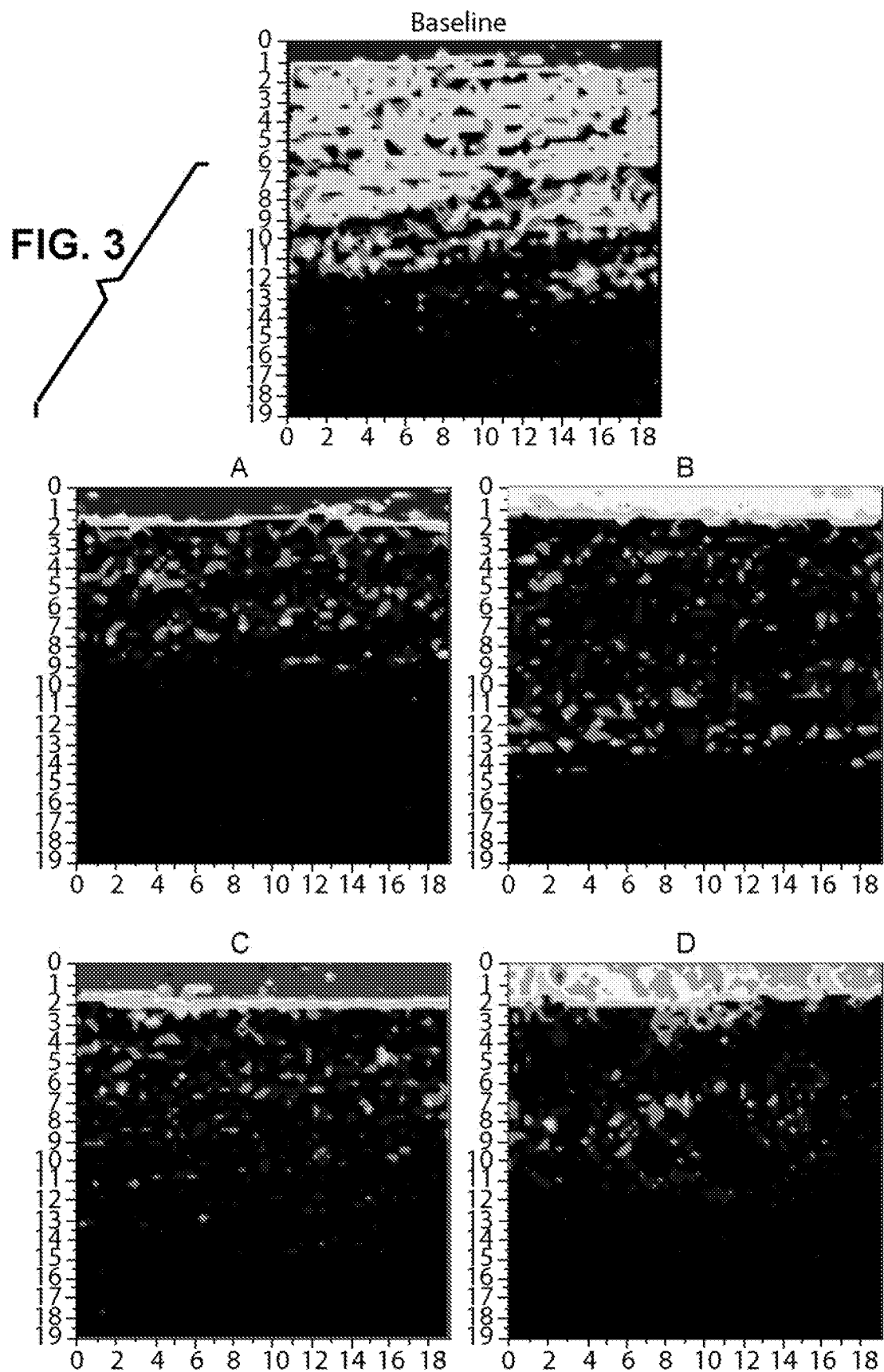
FIG. 3 shows an XRF Si map of the slag penetration of an untreated brick and treated bricks described in Examples 2-5.

Subsequent analysis of slag penetration by XRF mapping of Si distribution at the brick cross-section revealed that slag penetration in the treated brick is much less than the slag penetration in the untreated brick. FIG. 3 shows an XRF mapping of Si of the slag penetration of the untreated brick and the brick treated with chromium oxide.

Example 3

Example 1 was reproduced with the exception of using aluminum nitrate as the precursor for the aluminum oxide protective material. A slag infiltration test via isothermal annealing of cups filled with slag was performed on the brick infiltrated with aluminum oxide and on an untreated brick. Test parameters were 1500° C. for 20 hours at an oxygen partial pressure of $10^{-10}$ atm provided via a mixture of wet and dry $N_2/5\% H_2$ gas.

Subsequent analysis of slag penetration by XRF mapping of Si distribution at the brick cross-section revealed that slag penetration in the treated brick is much less than the slag penetration in the untreated baseline brick. FIG. 3 shows an XRF mapping of Si of the slag penetration of the untreated brick and the brick treated with aluminum oxide.

Example 4

Example 1 was reproduced with the exception of using cerium nitrate as the precursor for the cerium oxide protective material. A slag infiltration test via isothermal annealing of cups filled with slag was performed on the brick infiltrated with cerium oxide and on an untreated baseline brick. Test parameters were 1500° C. for 20 hours at an oxygen partial pressure of $10^{-10}$ atm provided via a mixture of wet and dry $N_2/5\% H_2$ gas.

Subsequent analysis of slag penetration by XRF mapping of Si distribution at the brick cross-section revealed that slag penetration in the treated brick is much less than the slag penetration in the untreated brick. FIG. 3 shows an XRF mapping of Si of the slag penetration of the untreated brick and the brick treated with cerium oxide.

Example 5

Example 1 was reproduced with the exception of using gadolinium nitrate and zirconium nitrate as the precursors for the gadolinium zirconate protective material. A slag infiltration test via isothermal annealing cups filled with slag was performed on the brick infiltrated with gadolinium zirconium oxide and on an untreated baseline brick. Test parameters were 1500° C. for 20 hours at an oxygen partial pressure of $10^{-10}$ atm provided via a mixture of wet and dry $N_2/5\%$ $H_2$ gas.

Subsequent analysis of slag penetration by XRF mapping of Si distribution at the brick cross-section revealed that slag penetration in the treated brick is much less than the slag penetration in the untreated baseline brick. FIG. 3 shows an XRF mapping of Si of the slag penetration of the untreated brick and the brick treated with gadolinium zirconate.

Example 6

A fused-cast and sintered brick of 75% weight chromia was vacuum infiltrated multiple times with a colloidal suspension of nano-scale particles of $Al_2O_3$ having particle sizes of about 50 nm. Between each infiltration, the brick was heated to 800° C. for 4 hours in air to decompose the dispersant. The same refractory brick was subsequently vacuum infiltrated multiple times with a colloidal suspension of nano-scale particles of $SiO_2$ having particle sizes of about 12 nm. Between each of the $SiO_2$ infiltrations the brick was heated to 120° C. for 2 hours to remove water.

A slag infiltration test via isothermal annealing of cups filled with slag was performed on the brick infiltrated with aluminum oxide and silica. The slag infiltration test was also performed on an untreated brick. Test parameters were 1500° C. for 20 hours at an oxygen partial pressure of $10^{-10}$ atm provided via a mixture of wet and dry $N_2/5\%$ $H_2$ gas.

Figure 4:
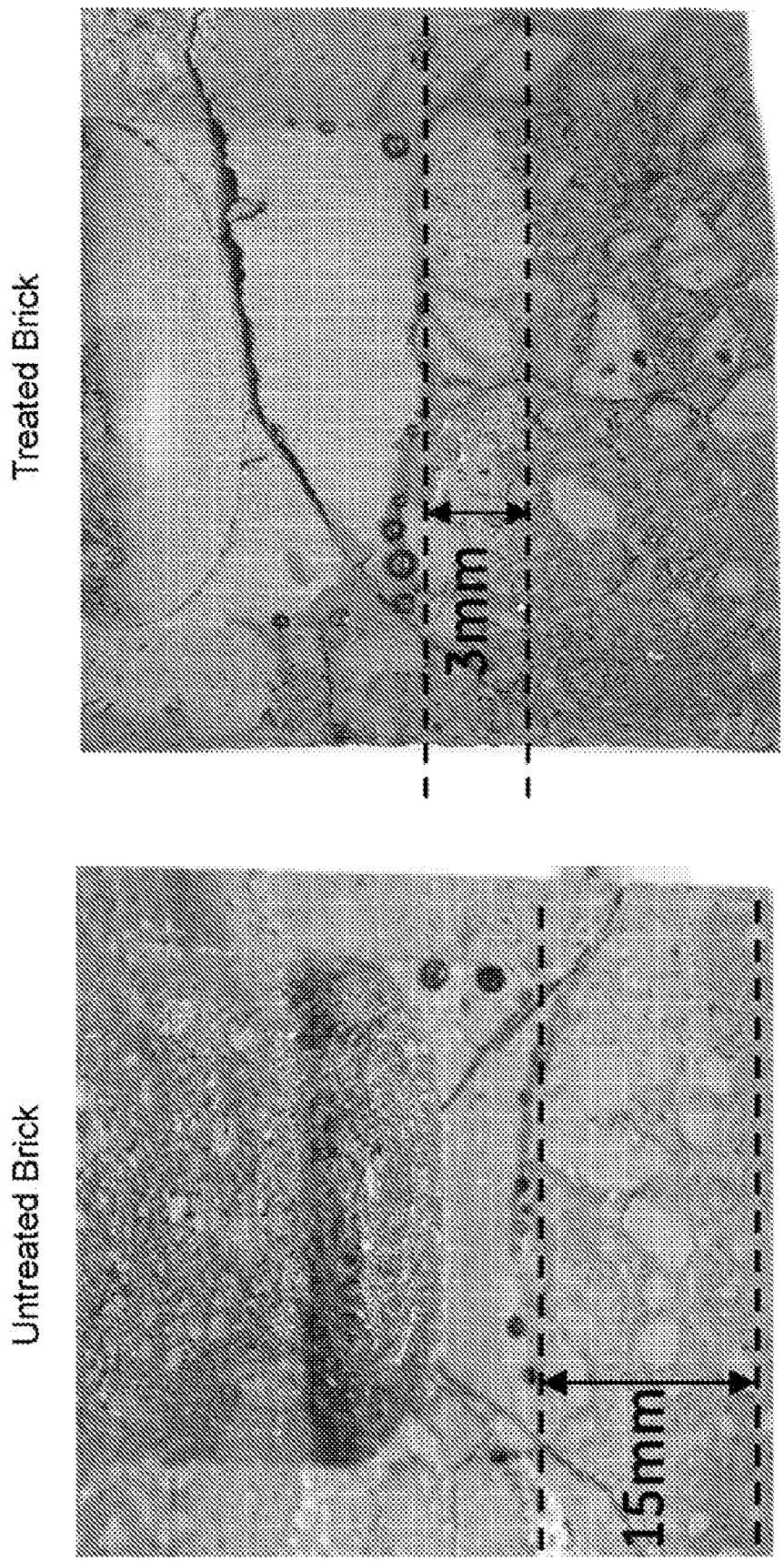
FIG. 4 shows the cross sections of the untreated and treated bricks described in Example 6.

The treated brick clearly shows reduced slag infiltration from 15 mm to 3 mm slag-penetration when compared with the untreated brick at the brick cross-section. The cross sections of the untreated brick and the treated brick are shown in FIG. 4.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

The invention claimed is:

1. A treated refractory material comprising a sintered porous refractory material comprising greater than or equal to 40 percent by weight chromium oxide and having one or more protective materials disposed within pores of the refractory material, wherein the protective material is a rare earth zirconate having a formula of $RE_2Zr_2O_7$, where RE is a rare earth element selected from the group consisting of lanthanum, cerium, praseodymium, neodymium, promethium, samarium, europium, gadolinium, terbium, dysprosium, holmium, erbium and ytterbium.

2. The treated refractory material of claim 1 wherein the refractory material comprises greater than or equal to 60 percent by weight chromium oxide.

3. The treated refractory material of claim 1 wherein the refractory material is a sintered brick.

4. The treated refractory material of claim 1 wherein the protective material fills from about 3 to about 60 percent of the volume of the pores in the refractory material.

5. The treated refractory material of claim 4 wherein the protective material fills from about 20 to about 50 percent of the volume of the pores in the refractory material.

6. The treated refractory material of claim 1 wherein the protective material is a powder.

7. The treated refractory material of claim 6 wherein the protective material is a micron-sized or nano-sized powder.

8. The treated refractory material of claim 7 wherein the protective material has particle sizes in the range of from about 5 nm to about 200 µm.

9. The treated refractory material of claim 8 wherein the protective material has particle sizes in the range of from about 5 nm to about 50 nm.

10. The treated refractory material of claim 1 wherein the amount of protective material comprises from about 2 to about 15 percent by volume based on the total volume of the refractory material.

11. A process for making treated refractory material comprises adding one or more protective materials to pores of porous sintered refractory material, wherein the protective material is a rare earth zirconate having a formula of $RE_2Zr_2O_7$, where RE is a rare earth element selected from the group consisting of lanthanum, cerium, praseodymium, neodymium, promethium, samarium, europium, gadolinium, terbium, dysprosium, holmium, erbium and ytterbium, and wherein said refractory material comprises greater than or equal to 40 percent by weight chromium oxid.

12. The process of claim 11 wherein the refractory material comprises greater than or equal to 60 percent by weight chromium oxide.

13. The process of claim 11 wherein the refractory material is a sintered brick.

14. The process of claim 11 wherein the protective material fills from about 3 to about 60 percent of the volume of the pores in the refractory material.

15. The process of claim 14 wherein the protective material fills from about 20 to about 50 percent of the volume of the pores in the refractory material.

16. The process of claim 11 wherein the protective material is a powder.

17. The process of claim 16 wherein the protective material is a micron-sized or nano-sized powder.

18. The process of claim 17 wherein the protective material has particle sizes in the range of from about 5 nm to about 200 nm.

19. The process of claim 18 wherein the protective material has particle sizes in the range of from about 5 nm to about 50 nm.

20. The process of claim 11 wherein the amount of protective material comprises from about 2 to about 15 percent by volume based on the total volume of the refractory material.

21. The process of claim 11 wherein the protective material is added to pores of the porous refractory material by painting, spraying, dipping, coating or vacuum infiltration.

22. The process of claim 21 wherein the protective material is added as a powder within a slurry.

23. The process of claim 21 wherein the protective material is added as a salt of the metal in solution.

24. The process of claim 11 wherein the refractory material is treated after the refractory material has been assembled into a gasifier.

25. The treated refractory material prepared by the process in claim 11.

26. A process for making treated refractory material comprising blending refractory material and one or more protective materials and sintering the blend, wherein the protective material is a rare earth zirconate having a formula of $RE_2Zr_2O_7$, where RE is a rare earth element selected from the group consisting of lanthanum, cerium, praseodymium, neodymium, promethium, samarium, europium, gadolinium, terbium, dysprosium, holmium, erbium and ytterbium, and wherein said refractory material comprises greater than or equal to 60 percent by weight chromium oxide.

27. The process of claim 26 wherein the protective material is added in an amount of from about 1 to about 10 percent by weight based on the weight of the blend.

28. The process of claim 26 wherein the blend is formed into a brick and sintered as a temperature from about 1000° C. to about 1800° C. for about 1 to about 24 hours.

29. The treated refractory material prepared by the process in claim 26.

30. A process for making treated refractory material comprising blending refractory material and one or more precursors of protective materials and sintering the blend, wherein the precursor material is in elemental or compound form and consists of rare earth elements, wherein the protective material is a rare earth zirconate having a formula of $RE_2Zr_2O_7$, where RE is a rare earth element selected from the group consisting of lanthanum, cerium, praseodymium, neodymium, promethium, samarium, europium, gadolinium, terbium, dysprosium, holmium, erbium and ytterbium, and wherein said refractory material comprises greater than or equal to 60 percent by weight chromium oxide.

31. The process of claim 30 wherein the protective material is added in an amount of from about 1 to about 10 percent by weight based on the weight of the blend.

32. The process of claim 30 wherein the blend is formed into a brick and sintered as a temperature from about 1000° C. to about 1800° C. for about 1 to about 24 hours.

33. The treated refractory material prepared by the process in claim 30.

* * * * *

UNITED STATES PATENT AND TRADEMARK OFFICE
CERTIFICATE OF CORRECTION

| | | |
|---|---|---|
| PATENT NO. | : 8,105,683 B2 | Page 1 of 1 |
| APPLICATION NO. | : 11/683260 | |
| DATED | : January 31, 2012 | |
| INVENTOR(S) | : Thompson et al. | |

It is certified that error appears in the above-identified patent and that said Letters Patent is hereby corrected as shown below:

In Column 10, Line 24, in Claim 11, delete "oxid." and insert -- oxide. --, therefor.

Signed and Sealed this
Twelfth Day of June, 2012

David J. Kappos
*Director of the United States Patent and Trademark Office*